United States Patent [19]
Brown

[11] Patent Number: 5,771,435
[45] Date of Patent: Jun. 23, 1998

[54] METHOD AND APPARATUS FOR PROCESSING REQUESTS FOR VIDEO PRESENTATIONS OF INTERACTIVE APPLICATIONS IN WHICH VOD FUNCTIONALITY IS PROVIDED DURING NVOD PRESENTATIONS

[75] Inventor: Ralph W. Brown, Boulder, Colo.

[73] Assignee: Time Warner Entertainment Co. L.P., Stamford, Conn.

[21] Appl. No.: 572,144

[22] Filed: Dec. 14, 1995

[51] Int. Cl.$^6$ .............................. H04N 7/173; H04N 7/14
[52] U.S. Cl. .................................................. 455/5.1; 348/7
[58] Field of Search .............................. 348/6, 7, 13, 10, 348/11, 12; 455/3.1, 6.3, 3.2, 4.1, 4.2, 5.1, 6.1, 6.2; H04N 7/10, 7/14, 7/173

[56] References Cited

U.S. PATENT DOCUMENTS

| | | |
|---|---|---|
| 3,956,717 | 5/1976 | Fisher et al. . |
| 4,214,316 | 7/1980 | Lipsky . |
| 4,506,387 | 3/1985 | Walter . |
| 4,530,008 | 7/1985 | McVoy . |
| 4,553,161 | 11/1985 | Citta . |
| 4,592,546 | 6/1986 | Fascenda et al. . |
| 4,823,386 | 4/1989 | Dumbauld et al. . |
| 4,991,208 | 2/1991 | Walker et al. . |
| 5,046,090 | 9/1991 | Walker et al. . |
| 5,093,718 | 3/1992 | Hoarty et al. . |
| 5,168,353 | 12/1992 | Walker et al. . |
| 5,220,420 | 6/1993 | Hoarty et al. . |
| 5,255,267 | 10/1993 | Hansen et al. . |
| 5,311,423 | 5/1994 | Clark . |
| 5,343,239 | 8/1994 | Lappington et al. . |
| 5,357,276 | 10/1994 | Banker et al. . |
| 5,361,091 | 11/1994 | Hoarty et al. . |
| 5,383,112 | 1/1995 | Clark . |
| 5,390,337 | 2/1995 | Jelinek et al. . |
| 5,394,394 | 2/1995 | Crowther et al. . |
| 5,400,402 | 3/1995 | Garfinkle . |

(List continued on next page.)

OTHER PUBLICATIONS

Adams, Michael, "Network Design and Implementation of a large–scale, ATM, Multimedia Network," *Engineer Conference Notes* from Networld$^{SM}$+Interop® 95, Las Vegas, NV (Mar. 27–31, 1995).

Adams, Michael, "Real Time MPEG Asset Delivery over ATM," *NCTA Technical Papers*, 1995:315–326 (1995).

News Release, "Time Warner Introduces World's First Full Service Network in Orlando," Timewarner Cable Full Service Network, Maitland, FL, 32751 (Dec. 14, 1994).

(List continued on next page.)

*Primary Examiner*—Mark R. Powell
*Assistant Examiner*—John W. Miller
*Attorney, Agent, or Firm*—Homer L. Knearl; Holland & Harp llp

[57] ABSTRACT

For an interactive communication system, the invention provides a method and apparatus for processing requests for video presentations of particular interactive applications. One embodiment of the invention initially receives, from a viewing node, a request for a video presentation of a particular interactive application. This embodiment then provides a near-video-on-demand (NVOD) presentation of the interactive application to the viewing node. At the time of the offer of the NVOD presentation, or during the NVOD presentation, the viewing node might request a video-on-demand (VOD) version of the interactive application. If such a request is made, and if the system's resources would not be constrained by the transmission of the video-on-demand presentation of the interactive application, then this embodiment transmits the video-on-demand version of the interactive application to the viewing node. On the other hand, if the system's resources would be constrained by the transmission of the VOD version, one embodiment of the invention's interactive system again directs the requesting viewer to view a near-video-on-demand version of the particular application.

24 Claims, 7 Drawing Sheets

U.S. PATENT DOCUMENTS

| | | |
|---|---|---|
| 5,412,720 | 5/1995 | Hoarty . |
| 5,421,031 | 5/1995 | De Bey . |
| 5,422,674 | 6/1995 | Hooper et al. . |
| 5,423,555 | 6/1995 | Kidrin . |
| 5,425,027 | 6/1995 | Baran . |
| 5,426,699 | 6/1995 | Wunderlich et al. . |
| 5,442,700 | 8/1995 | Snell et al. . |
| 5,446,726 | 8/1995 | Rostoker et al. . |
| 5,452,297 | 9/1995 | Hiller et al. . |
| 5,453,979 | 9/1995 | Schibler et al. . |
| 5,455,701 | 10/1995 | Eng et al. . |
| 5,455,820 | 10/1995 | Yamada . |
| 5,455,825 | 10/1995 | Lauer et al. . |
| 5,459,722 | 10/1995 | Sherif . |
| 5,682,597 | 10/1997 | Ganek et al. ............... 455/4.2 |

OTHER PUBLICATIONS

Product Information Package from Wink Communications, 2061 Challenger Drive, Alameda, CA 94501 (1995).

Request for Proposals, "Development of a Full Service Network: A request by Time Warner for assistance in building a full service telecommunications network" (Feb. 11, 1993), Time Warner Cable, Denver, CO.

Vecchi, Mario P., and Adams, Michael, "Traffic Management for Highly Interactive Transactional System," *NCTA Technical Papers*, 1995:258–266 (1995).

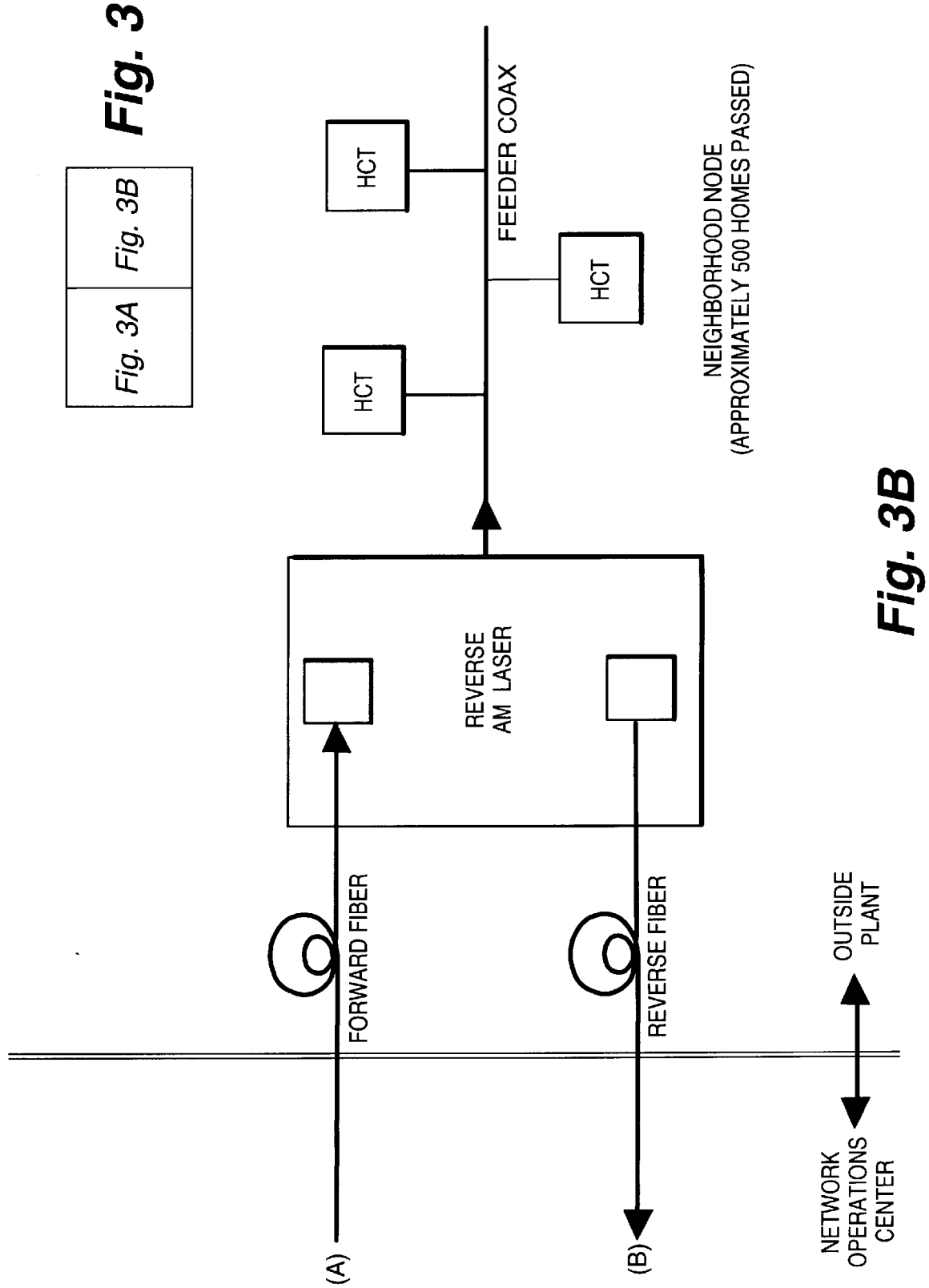

5,771,435

METHOD AND APPARATUS FOR PROCESSING REQUESTS FOR VIDEO PRESENTATIONS OF INTERACTIVE APPLICATIONS IN WHICH VOD FUNCTIONALITY IS PROVIDED DURING NVOD PRESENTATIONS

The present invention is directed towards a method and apparatus for processing requests for video presentations of interactive applications.

BACKGROUND OF THE INVENTION

Traditionally, television has been used as a passive device, that only allows a viewer to control the volume and channel, while reserving control of the content as well as the presentation time and format for the service provider. In recent years, however, a number of interactive systems have been created, in order to enable viewers to use their televisions as interactive devices.

Specifically, with the advent of interactive services in the home entertainment field, televisions have become active devices, that allow their viewers greater flexibility and control over the content, the presentation time, and the presentation format of their selected interactive applications. Interactive applications are stored programs, whose operations are wholly or partly controlled by commands from local viewing nodes of the interactive system.

Interactive systems utilize a mix of broadcast and point-to-point communication modes. In particular, interactive systems transmit shared, one-way, broadcast digital information streams to all their subscribers, in order to provide cable and network programming to their subscribers. Interactive systems also utilize a number of dedicated, two-way communication paths to (1) provide interactive applications from a central service source to a local viewing node, and (2) relay commands from the local viewing node to the central service source. In addition, some interactive systems transmit interactive applications through shared information streams.

Establishing a dedicated communication link expends a certain amount of an interactive system's shared resources (such as a service source's server resources, a communication network's transmission bandwidth and switching resources, etc.). Consequently, as typical interactive systems have finite resources due to financial considerations, these systems do not transmit each of their interactive applications to all of their possible viewers over dedicated communication links simultaneously. Rather, efficient interactive systems are often designed to handle specified peak dedicated-path-usage rates, which are computed by using statistics and probability. This type of peak rate design is analogous to the peak rate design used in telephone systems, which similarly use such a design for reducing hardware costs.

One manner by which prior art interactive systems minimize hardware costs is by only using a near-video-on-demand (NVOD) movie presentation format to provide features similar to VCR functional features (e.g., provide skip forward, skip backward, and pause features to emulate fast forward, rewind, pause VCR features). To emulate VCR functional features exactly, an interactive entertainment system would have to provide a true video-on-demand (VOD) presentation of an interactive application to a viewer. A VOD presentation of an interactive application is a version of the application that is transmitted to the viewer over a dedicated communication path. In other words, for a VOD presentation, the viewer would need to receive the interactive application through a dedicated communication link, which, in turn, would enable the viewer to completely control the presentation of the interactive application (i.e., would enable the viewer to exercise VCR functional features, such as fast forward, rewind, pause, etc.).

However, in order to achieve network efficiency, prior art interactive entertainment systems forego VOD presentations of interactive applications, and thereby do not provide the exact VCR functional features to their viewers. Instead, prior art interactive entertainment systems provide their viewers NVOD presentations of interactive applications, in order to offer features that crudely approximate VCR functional features.

In NVOD programming, the interactive entertainment system broadcasts several time-shifted versions of an interactive application (i.e., broadcasts duplicate versions of the application, with the starting time of each version offset by a unique, predetermined time increment) to all of its subscribers over shared communication paths. Typically, interactive systems utilize NVOD services to provide several presentations of a movie, where the presentation start-times are staggered so that no two presentations start at the same time.

NVOD programming also permits an interactive system to emulate the functions of a VCR, by enabling the viewer to (1) stop viewing an originally-requested presentation of the interactive application, and (2) start viewing another presentation of the application that started earlier or later than the originally-requested presentation. For example, if the viewer selects the skip forward function, the system tunes to the NVOD presentation that started one or more intervals prior to the presentation that the viewer is presently watching. On the other hand, in response to a subscriber command to skip back, the subscriber receives the NVOD presentation that started one or more time intervals after the currently-viewed version.

Unfortunately, even when prior art interactive communication systems have sufficient resources to support VOD presentations, they unnecessarily limit themselves to only providing NVOD services, as a conservative means for saving their shared resources. Consequently, there is a need in the art for a video-request processing scheme which provides VOD services, when the interactive system has sufficient resources to support such services.

SUMMARY OF THE INVENTION

For an interactive communication system, the invention provides a method and apparatus for processing requests for video presentations of particular interactive applications. One embodiment of the invention initially receives, from a viewing node, a request for a video presentation of a particular interactive application. This embodiment then provides a near-video-on-demand (NVOD) presentation of the interactive application to the viewing node.

At the time of the offer of the NVOD presentation, or during the NVOD presentation, the viewing node might request a video-on-demand (VOD) version of the interactive application. If such a request is made, and if the system's resources would not be constrained by the transmission of the video-on-demand presentation of the interactive application, then this embodiment transmits the video-on-demand version of the interactive application to the viewing node. On the other hand, if the system's resources would be constrained by the transmission of the VOD version, one embodiment of the invention's interactive system again directs the requesting viewer to view a near-video-on-demand version of the particular application.

BRIEF DESCRIPTION OF THE DRAWINGS

The novel features of the invention are set forth in the appended claims. However, for purpose of explanation, several embodiments of the invention are described by reference to the following figures.

DETAILED DESCRIPTION OF THE INVENTION

Figure 1:
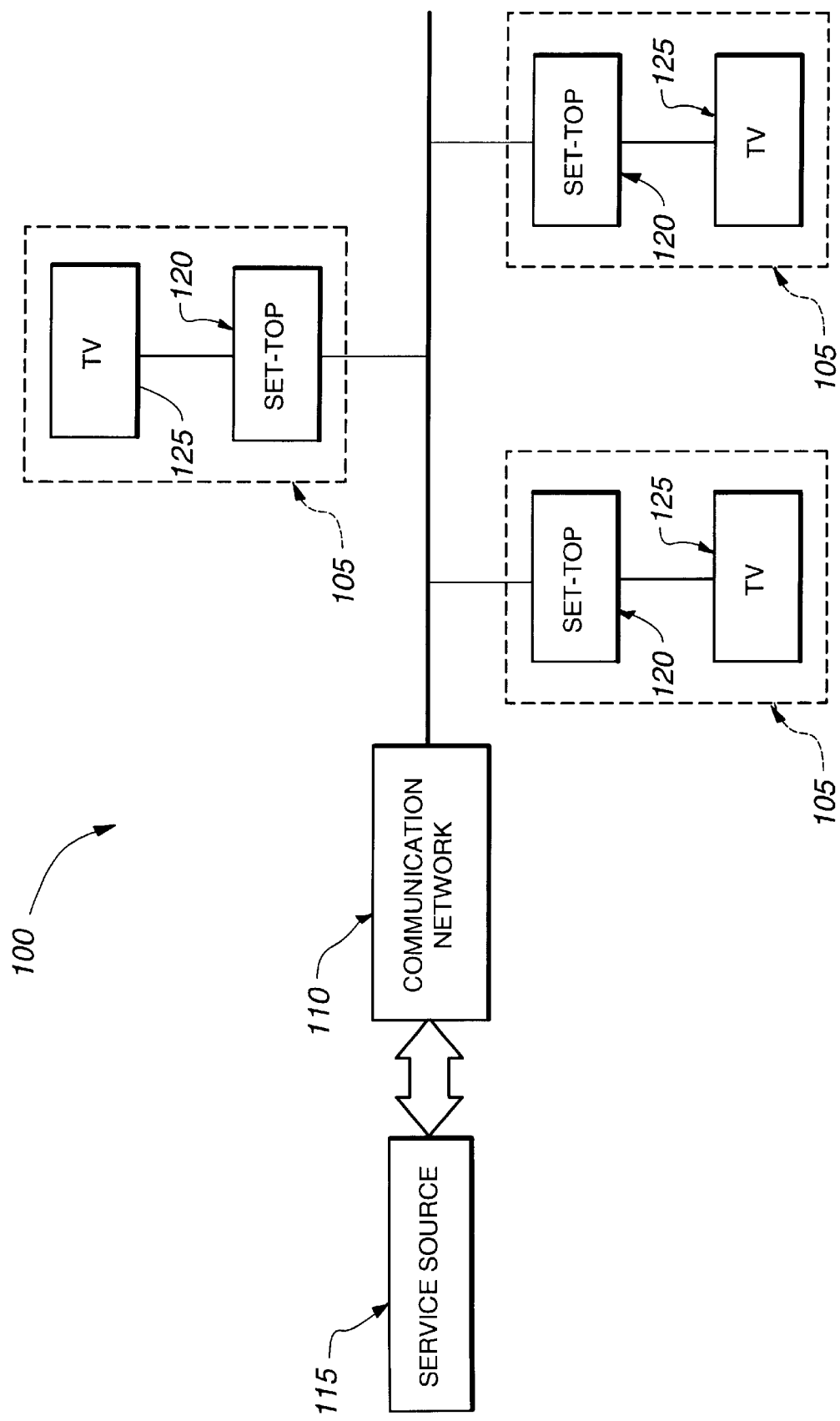
FIG. 1 presents an interactive communication system used by the invention.

The invention provides a method and apparatus for processing requests for video presentations of interactive applications. In the following description, numerous details are set forth for purpose of explanation. However, one of ordinary skill in the art would realize that the invention may be practiced without the use of these specific details. In other instances, well-known structures and devices are shown in block diagram form in order not to obscure the description of the invention with unnecessary detail.

The invention is adapted to operate in an interactive communication system. One embodiment of the invention initially receives, from a viewing node, a request for a video presentation of a particular interactive application. This embodiment then provides a near-video-on-demand (NVOD) presentation of the interactive application to the viewing node. At the time of the offer of the NVOD presentation, or during the NVOD presentation, the viewing node might request a video-on-demand (VOD) version of the interactive application in order to exercise VCR functional features (such as fast forward, rewind, pause, etc.).

If such a request is made, and if the system's resources would not be constrained by the transmission of the video-on-demand presentation of the interactive application, then this embodiment transmits the video-on-demand version of the interactive application to the viewing node. On the other hand, if the system's resources would be constrained by the transmission of the VOD version, one embodiment of the invention's interactive system again directs the requesting viewer to view a near-video-on-demand version of the particular application.

One embodiment of the invention determines whether the transmission of the VOD version of the requested application would constrain the shared resources of the interactive communication system, by utilizing a mathematical expression to determine the available capacity of the system. In other words, one embodiment of the invention utilizes a mathematical relationship to determine whether the interactive system's shared resources have sufficient bandwidth to support the transmission of the requested VOD version.

Alternatively, as further discussed below, another embodiment of the invention makes this determination by ascertaining whether the transmission of the VOD version would cause the number of transmitted VOD versions of the requested application to exceed a pre-specified maximum number. For example, one embodiment of the invention denies the VOD request if it ascertains that the number of currently transmitted VOD versions of the requested application equals a pre-specified maximum number.

Another embodiment of the invention conserves the systems resources by limiting the total number of transmitted VOD versions for all interactive applications. Specifically, instead of maintaining individual limits for the number of transmitted VOD versions of each interactive application, one embodiment of the invention limits the number of transmitted VOD versions of all interactive applications. Consequently, when the number of all transmitted VOD versions reaches its maximum value, this embodiment of the invention determines that additional VOD transmissions would constrain the system resources, and therefore denies VOD requests until one or more of the active VOD sessions terminate.

FIG. 1 presents an interactive communication system 100 used by the invention. This system includes a number of home terminal nodes 105, a communication network 110, a service source 115. As shown in FIG. 1, each home terminal node 105 includes a set-top terminal 120 and a television 125. Each set-top controls the operation of its corresponding television. In particular, through communication network 110, a set-top (1) establishes a communication link between the television viewer and the service source, (2) presents, via the television, selectable programming options provided by the service source to the viewer, and (3) relays program selections from the viewer to the service source.

Figure 2:
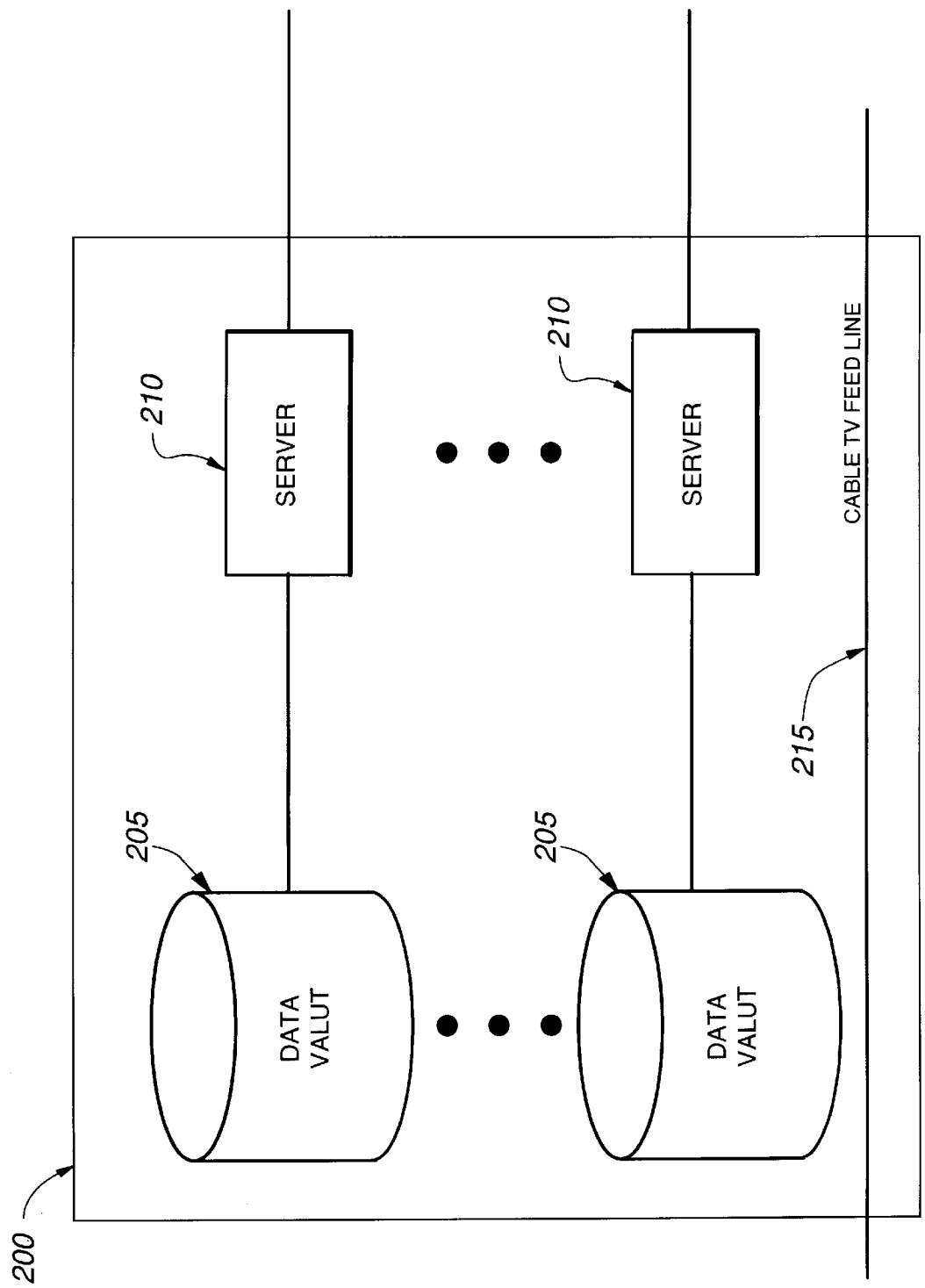
FIG. 2 presents an example of a service source used in the interactive communication system of FIG. 1.

FIG. 2 presents an example of a service source used in the interactive communication system of FIG. 1. As shown in FIG. 2, one example of the service source includes a number of data storage vaults 205, a number of media servers 210, and a cable TV feedline 215. Service source 200 utilizes data storage vaults 205 and media servers 210 to provide a variety of interactive digital services to the subscribers of the system. Specifically, data storage vaults 205 are used to store the digital programming content, and media servers 210 are used to retrieve the stored digital media in response to requests from the home terminal nodes.

The retrieved digital programs can then be transmitted through a shared information stream or a dedicated information stream. A shared information stream is used to transmit data to a number of subscribers, while a dedicated information stream is used to transmit data to a specific user. In addition, an information stream can be assigned all or part of a frequency band used by the network. As further shown in FIG. 2, service source 200 also has a cable feedline 215, which receives cable programming from the local cable company and supplies this programming to the network. The network then broadcasts the cable programming to all of the system's subscribers on shared information streams.

Figure 3A:
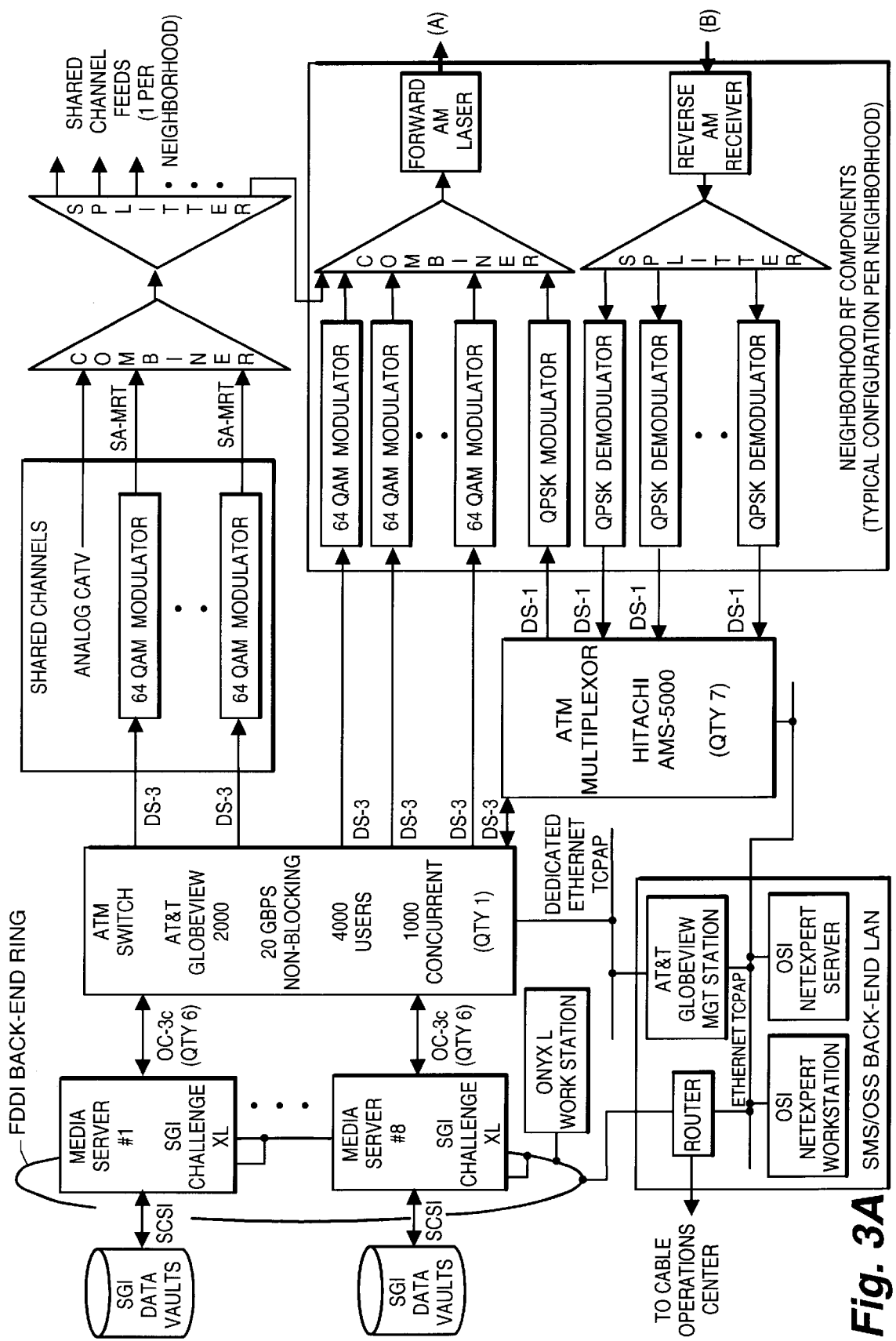
FIG. 3 presents another interactive communication system used by the invention.

FIG. 3 presents another interactive entertainment system used by the invention. A description of this interactive entertainment system is provided in the United States Application entitled "A Method For Message Addressing In A Full Service Network," filed on Dec. 14, 1995, and assigned to the assignee of the present application. The disclosure of this application is incorporated in the present application by reference.

Figure 4:
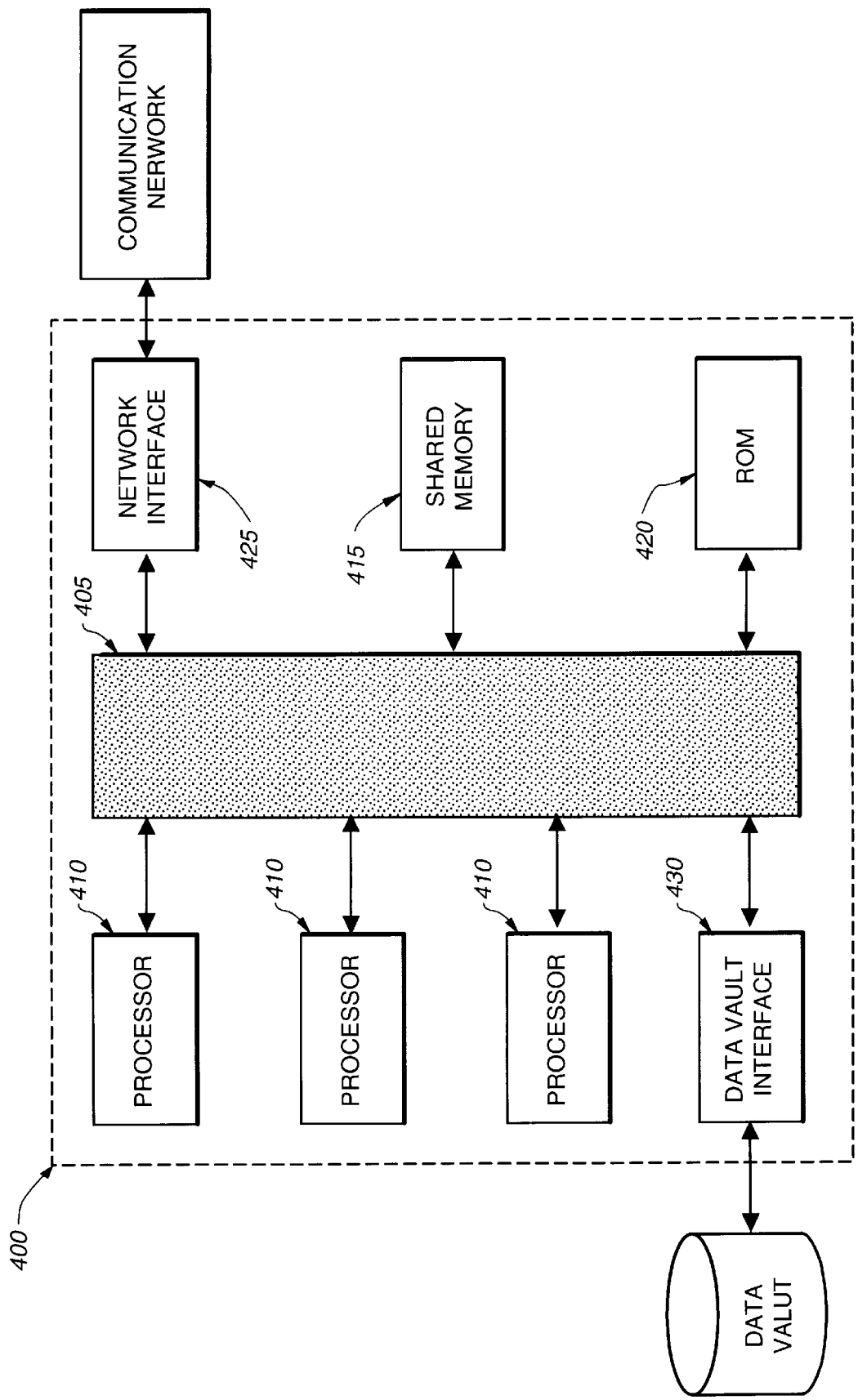
FIG. 4 presents a server used in the service source of the interactive communication system of FIG. 1.

FIG. 4 presents a server 400 used in service source 200 of FIG. 2. This server is used to retrieve stored digital interactive applications from data vaults, and to supply these applications to the communication network for transmission to the home terminal nodes. In particular, the role of the video server is to provide storage and playback of the video data and to respond to subscriber requests, such as "pause," "fast forward," "view the next product," etc. In addition, during operation, the service source's servers also store the operating system necessary for the operation of the interactive communication system.

Server 400 has a shared memory SMP (Symmetric Multiprocessing) architecture, which includes a high-speed system bus interconnecting processors, memory, and data and network I/O subsystems. Specifically, as shown in FIG. 4, server 400 includes internal bus 405, processors 410, shared random access memory 415, read-only memory (ROM) 420, network interface 425, and data vault I/O interface 430. High-speed bus 405 represents the collective communication interface between the numerous internal modules of server 400. In addition, this sever utilizes processors 410 for processing digital signals, and thereby controlling the managing the operation of the server.

Processor 410 is directed by the software and firmware instructions that respectively reside in RAM 415 and ROM 420. In particular, in one embodiment of the invention, server 400 utilizes RAM 415 to store a source code necessary for the operation of the invention (i.e., server 400 utilizes the software residing in RAM 415 to direct the invention's processing of requests for interactive applications by guiding the actions of processor 410). In another embodiment of the invention, the firmware instructions (i.e., the source code residing in ROM 420) direct the invention's processing of requests for interactive applications. Server 400 also uses RAM 415 to store temporary variables or other intermediate information during the operation of the processor.

Because the memory and I/O devices are shared equally among all of the processors in the system, this server's architecture is called symmetric multiprocessor systems. Typically, SMP systems scale from one processor to as many as 36 processors. Examples of SMP architecture include the Silicon Graphics, Inc. Challenge server systems and the Sun Microsystems, Inc. SPARC server systems.

In the SMP architecture, the processing load is uniformly distributed across all of the processors in the system. Scheduling algorithms in the kernel allocate processing load to unoccupied or lightly loaded processors. All processors have equal access to the physical memory and see a uniform memory image. Data written to the shared memory by one processor is immediately available to all the other processors. Software processes, both kernel and user, are able to run concurrently, and can be switched arbitrarily among any of the processors in the computer. Since all of the processors are operating out of shared memory, access to critical data and code is protected by locking mechanisms that prevent concurrent access.

As further shown in FIG. 4, server 400 also includes data vault interface 430. Through this interface, server 400 reads out data from one or more data vaults, and transfers this data to a buffer area in the shared memory 415. The data is then transferred from this buffer area to network interface 425 for transmission to the communication network. In one embodiment of the invention, the network interface is an ATM network interface which transfers data to an ATM switch for transmission. Finally, one of ordinary skill in the art would recognize that numerous alternative embodiments of server 210 exist. For example, in one embodiment of the invention, the service source's servers have an MPP (Massively Parallel Processor) architecture.

Figure 5:
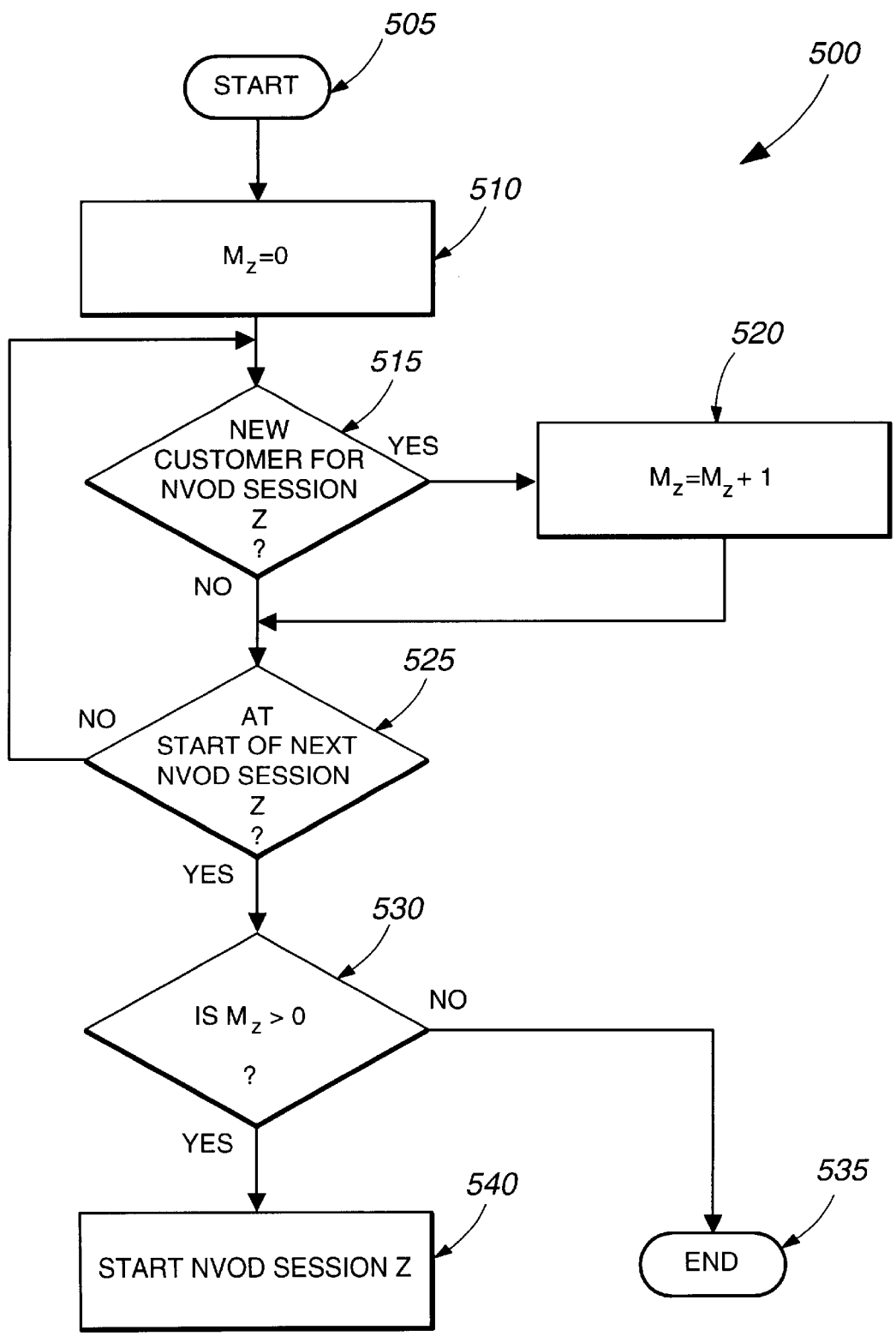
FIGS. 5–6 present one embodiment of the invention for processing requests for video presentations of interactive applications.
Figure 6:
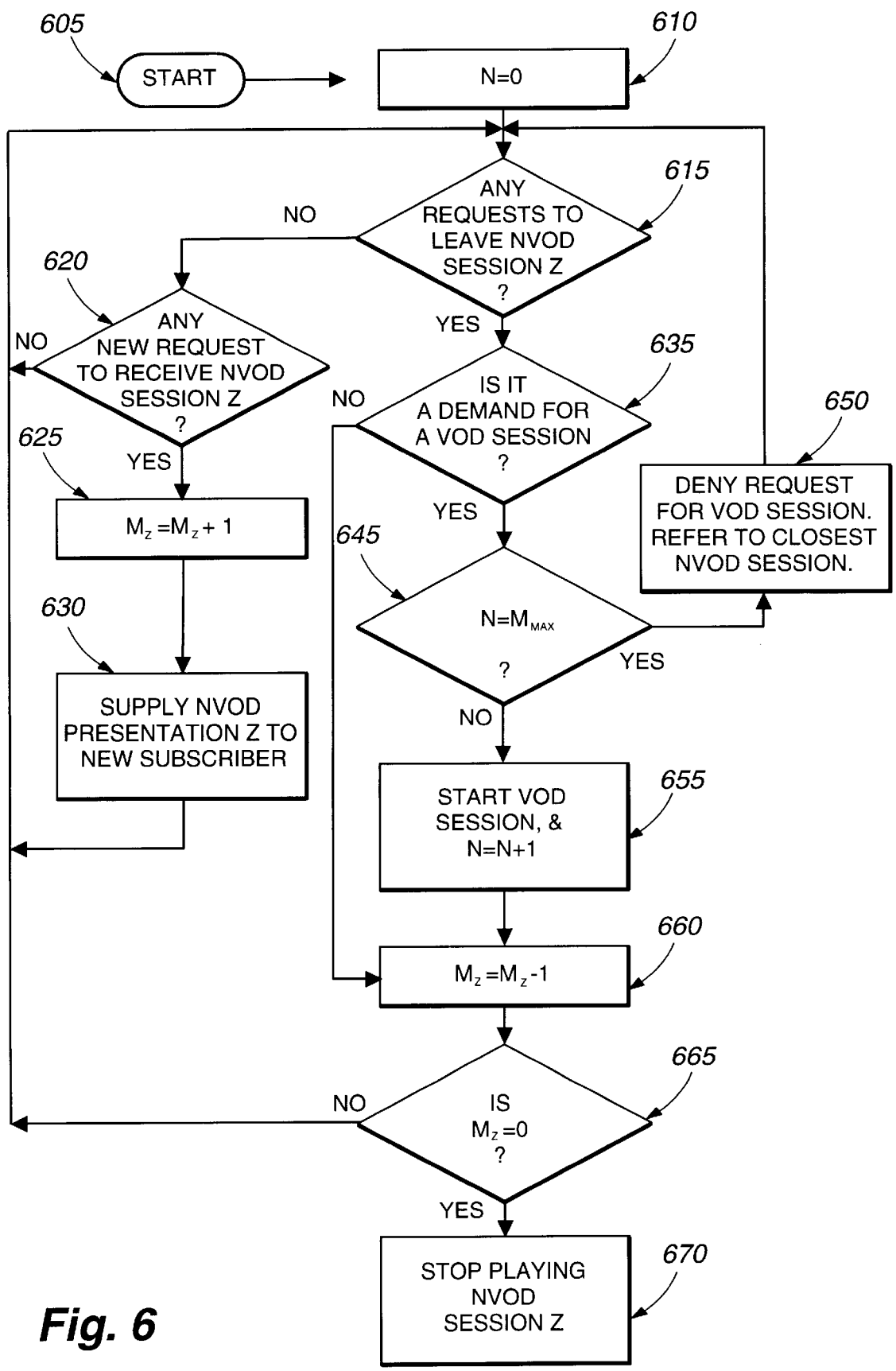

FIGS. 5 and 6 present one embodiment of the invention for processing requests for video presentations of a particular interactive application. This embodiment of the invention can be implemented as a software or a firmware code of the server or the set-top. The following description pertains to the embodiment of the invention that is implemented as the software of the server.

For one embodiment of the invention, FIG. 5 sets forth the steps performed by one of the service source's servers prior to the start of an NVOD presentation Z of a particular interactive application. The initial step in this figure's flowchart is start step 505. At this step, process 500 starts at a pre-specified date and time. For example, in one embodiment of the invention, process 500 starts at the designated start-time for receiving requests for NVOD session Z.

The process then transitions to step 510, during which the server sets the value of NVOD-customer-count variable $M_z$ to zero. Variable $M_z$ represents the number of customers currently viewing, or currently waiting in a queue to view, NVOD presentation Z. Moreover, variable Z identifies a unique NVOD version of the interactive application.

From step 510, the process transitions to step 515, during which a determination is made whether NVOD session Z has a new subscriber. One embodiment of the invention determines that NVOD session Z has a new subscriber when (1) a subscriber requests a video presentation of the interactive application, (2) the system provides the viewer with the option of viewing NVOD session Z, which starts at, or close to, the requested start-time, and (3) the subscriber accepts this option.

If, at step 515, process 500 determines that NVOD session Z has a new subscriber, the process transitions to step 520 to increment the NVOD-customer-count variable $M_z$ by one. From step 520, the process then transitions to step 525, during which the process decides whether the start-time for the presentation of NVOD session Z has been reached. If not, the process (1) assign the viewer's request to a queue, which holds all the requests for NVOD session Z, and (2) transitions back to step 515.

The process also transitions to step 525 from step 515, if it determines that NVOD session Z does not have a new subscriber. Moreover, if (at step 525) the process determines that the presentation start-time has passed, the process transitions to step 530. At this step, process 500 examines the value of NVOD-customer-count variable $M_z$. If this count is not greater than zero, the process transitions to step 535 to terminate its operation. However, if the count is greater than zero, the process transitions to step 540, where it starts NVOD presentation Z by transmitting NVOD version Z on a shared information stream to all of the requesting subscribers (whose requests were previously placed in the queue for session Z, at step 525).

For one embodiment of the invention, FIG. 6 sets forth the steps performed by one of the service source's servers during the playing of NVOD presentation Z. The first step in the flowchart of FIG. 6 is the start step 605, which corresponds to step 540 of FIG. 5. Next, the process transitions to step 610, where it sets a VOD-customer-count variable N to zero. Variable N represents the number of customers that have left NVOD session Z to view VOD versions of the particular interactive application.

From step 610, the process transitions to step 615 to determine whether a subscriber has recently requested to leave NVOD session Z. If, at step 615, the process does not encounter any such requests, the process transitions to step 620. At this step, the process determines if a new subscriber has requested to receive NVOD session Z, whose presentation is already in progress. If not, process 600 transitions back to step 615. However, if a subscriber has recently requested to receive NVOD session Z, the process (1)

initially transitions to step 625 to increment the NVOD-customer-count variable by one, (2) then transitions to step 630 to supply NVOD presentation Z to the new subscriber, and (3) eventually transitions back to step 615.

On the other hand, if (at step 615) the process determines that a subscriber has requested to leave NVOD session Z, the process transitions to step 635. At this step, the process determines if the subscriber's request is a demand for terminating NVOD session Z to begin a VOD session. If not, the process transitions to step 660 to decrement the NVOD-customer-count variable by one.

If, at step 635, the process determines that the subscriber's request is a demand for a VOD session, it transitions to step 645, where the process examines the value of VOD-customer-count variable N. If this value equals the maximum VOD-customer-count value, the process transitions to step 650 (1) to deny the request for the VOD presentation, in order to conserve the resources of the interactive system, and (2) to refer the viewer to the NVOD session closest to the requested VOD session. The process then transitions back to step 615.

If, at step 645, the process determines that the VOD-customer-count N does not equal the maximum VOD-customer-count $N_{max}$, the process transitions to step 655 (1) to start the requested VOD session by transmitting a video presentation of the interactive application through a dedicated information stream to the requesting subscriber, and (2) to increment the VOD-customer-count variable N by one. Next, process 600 transitions to step 660, in order to decrement the NVOD-customer-count variable by one.

From step 660, the process transitions to step 665 to determine whether the NVOD-customer-count variable $M_z$ equals zero. If so, the process transitions to step 670 to terminate the NVOD session Z. Otherwise, the process transitions back to step 615 to wait for a viewer to leave the session, for a viewer to join the session, or for the session to terminate.

The invention has been described above by reference to process 600, which conserves the shared resources of the system by having pre-specified limits for the number of transmitted VOD versions of each interactive application. However, one of ordinary skill would recognize that an alternative embodiment of the invention limits the number of transmitted VOD versions of all interactive applications, in order to prevent the system's shared resources from being constrained.

In other words, another embodiment of the invention conserves the systems resources by limiting the total number of transmitted VOD versions for all interactive applications. Consequently, when the number of all transmitted VOD versions reaches its maximum value, this embodiment of the invention determines that additional VOD transmissions would constrain the system resources, and therefore denies VOD requests until one or more of the active VOD sessions terminate.

Alternatively, another embodiment of the invention utilizes a mathematical relationship to determine that the transmission of the VOD version of the requested application would constrain the shared resources of the interactive communication system. In particular, one embodiment of the invention utilizes a mathematical expression to determine whether the interactive system's shared resources have sufficient bandwidth to support the transmission of the requested VOD version. One example of such a mathematical relationship is:

IF
    {(Current_NetworkBandwidth + Requested_NetworkBandwidth)>
    Total_NetworkBandwidth)},
    {(Current_SCSIBandwidth + Requested_SCSIBandwidth)>
    Total_SCSIBandwidth)},
    {(Current_SwitchBandwidth + Requested_SwitchBandwidth)>
    Total_SwitchBandwidth)}, OR
    {(Current_ServerBandwidth + Requested_ServerBandwidth)>
    Total_ServerBandwidth)},
THEN resources constrained.

In the above-recited equation, (1) NetworkBandwidth variables represent the capacity of the transmission frequency bands used by the communication network, (2) the SCSIBandwidth variables represent the relaying capacity of the SCSI interconnect connecting the servers to the data vaults, (3) the SwitchBandwidth variables represent the switching capacity of the ATM switches of the communication network, and (4) the ServerBandwidth variables represent the processing capacity of the servers.

In addition, the variables that have the "Current" prefix represent the portion of the particular bandwidth that is currently being used, while the variables that have the "Requested" prefix represent the portion of the particular bandwidth necessary for the transmission of the requested VOD version. Also, the variables that have the "Total" prefix represent the total amount of the particular bandwidth. The values of all these variables are determined by utilizing conventional traffic management algorithms.

The invention is advantageous because it provides a video-request processing method and apparatus for providing VOD services when the interactive system has sufficient resources to support such services. For example, the invention maintains the efficiency of an interactive system by providing popular movies in a NVOD format to a majority of the system subscribers, while utilizing the available system bandwidth to provide some subscribers with true VOD capability. In turn, by providing subscribers with VOD versions of interactive applications, the invention enables the system subscribers to exercise VCR functional features, such as fast forward, rewind, pause, etc.

While the invention has been described with reference to numerous specific details, one of ordinary skill in the art would recognize that the invention can be embodied in other specific forms without departing from the spirit of the invention. For example, one of ordinary skill in the art would recognize that, although the invention has been described by reference a home terminal node that includes a set-top terminal and a television, alternative embodiments of the invention utilize home terminal nodes that include a cable modem and a computer. In these embodiments, a display device of the computer is used for displaying the transmitted programming.

In addition, even though one embodiment of the invention has been described by reference to a terrestrial communication network, one of ordinary skill in the art would realize that an alternative embodiment of the invention utilizes a satellite communication system. Also, although each local viewing node 105 of FIG. 1 only has one set-top and one television, one of ordinary skill in the art would appreciate that in an alternative embodiment of the invention each local viewing node has multiple viewing stations. Thus, one of ordinary skill in the art would understand that the invention is not to be limited by the foregoing illustrative details, but rather is to be defined by the appended claims.

I claim:

1. In an interactive communication system, a method of processing requests for video presentations of interactive applications, said method comprising the steps of:
    (a) receiving a request, from a viewer, for a video presentation of an interactive application;
    (b) presenting to said viewer a near-video-on-demand version of said interactive application;
    (c) receiving a request, from said viewer, for a video-on-demand version of said interactive application;
    (d) determining if said transmission of said video-on-demand version of said interactive application would constrain resources of the interactive communication system; and
    (e) presenting said video-on-demand version of said interactive application to said viewer, if said presentation of said video-on-demand version of said interactive application would not constrain resources of the interactive communication system.

2. The method of claim 1 further comprising the step of denying said request for said video-on-demand version of said interactive application, if said presentation of said video-on-demand version of said interactive application would constrain resources of the system.

3. The method of claim 1, wherein said viewer requests a video-on-demand version of said interactive application in order to exercise VCR functional features.

4. The method of claim 1, wherein said determining step includes a step of determining if the number of currently presented video-on-demand presentations of said interactive application equals a predetermined maximum number.

5. The method of claim 1, wherein said determining step includes a step of determining if the number of currently presented video-on-demand presentations of a plurality of said interactive applications equals a predetermined maximum number.

6. The method of claim 1, wherein said determining step includes a step of utilizing a mathematical relationship to determine whether said interactive system's resources have sufficient bandwidth to support the transmission of the requested video-on-demand version.

7. In an interactive communication system, a method of processing requests for video presentations of interactive applications, said method comprising the steps of:
    (a) receiving a request, from a viewing node, to transmit a video presentation of an interactive application;
    (b) transmitting to said viewing node a near-video-on-demand version of said interactive application through a shared information stream;
    (c) receiving a request, from said viewing node, to transmit a video-on-demand version of said interactive application through a communication network;
    (d) determining if transmission of said video-on-demand version of said interactive application through a communication network would constrain shared resources of the interactive communication system; and
    (e) transmitting said video-on-demand presentation of said interactive application, if said transmission of said video-on-demand version would not constrain resources of the system.

8. The method of claim 7 further comprising the step of denying said request for the transmission of said video-on-demand version of said interactive application and providing said viewing node with an option to view another near-video-on-demand version of said interactive application.

9. The method of claim 7, wherein said viewing node requests a video-on-demand version of said interactive application in order to exercise VCR functional features.

10. The method of claim 7, wherein said determining step includes a step of determining if the number of currently presented video-on-demand versions of said interactive application equals a predetermined maximum value.

11. The method of claim 7, wherein said determining step includes a step of determining if the number of currently presented video-on-demand versions of a plurality of interactive applications equals a predetermined maximum value.

12. The method of claim 7, wherein said determining step includes a step of utilizing a mathematical relationship to determine whether said interactive system's resources have sufficient bandwidth to support the transmission of the requested video-on-demand version.

13. An apparatus for processing requests for video presentations of interactive applications, said apparatus adapted to operate in an interactive communication network, said apparatus comprising:
    (a) receiving means for receiving requests to transmit video presentations of interactive applications;
    (b) determining means, coupled to said receiving means, for determining if transmission of video-on-demand versions of said interactive applications through a communication network would constrain shared resources of the interactive communication system; and
    (c) responding means, coupled to said determining means, for
        (1) responding to an initial request from a viewer for a video presentation of an interactive application by transmitting to said viewer a near-video-on-demand version of said interactive application through a shared information stream, and
        (2) responding to a subsequent request from said viewer for transmission of a video-on-demand version of said interactive application through a communication network by transmitting said video-on-demand presentation, if said determining means determines that said transmission would not constrain resources of the interactive communication system.

14. The apparatus of claim 13, wherein said responding means denies said request for the transmission of said video-on-demand version of said interactive application and provides said viewer with an option to view a near-video-on-demand version of said interactive application, when said transmission of said video-on-demand version of said 'interactive application would constrain resources of the system.

15. The apparatus of claim 13, wherein said viewer requests a video-on-demand version of said interactive application in order to exercise VCR functional features.

16. The apparatus of claim 13, wherein said determining means includes means for determining if the number of currently presented video-on-demand versions of said interactive application equals a predetermined maximum value.

17. The apparatus of claim 13, wherein said determining means includes means for determining if the number of currently presented video-on-demand versions of a plurality of interactive applications equals a predetermined maximum value.

18. The apparatus of claim 13, wherein said determining means includes means for calculating available bandwidth of said interactive system's resources in order to determine if said resources can support the transmission of the requested video-on-demand version.

19. An interactive communication system comprising:
(a) a service source storing a plurality of interactive applications;
(b) a plurality of viewing nodes for viewing said interactive applications; and
(c) a communication network coupling said service source and said viewing nodes;
(d) wherein said service source includes means for processing requests for video presentations of said interactive applications, said processing means including:
  (1) receiving means for receiving requests to transmit video presentations of interactive applications;
  (2) determining means, coupled to said receiving means, for determining if transmission of video-on-demand versions of said interactive applications through a communication network would constrain shared resources of the interactive communication system; and
  (3) responding means, coupled to said determining means, for (i) responding to an initial request from a viewer for a video presentation of an interactive application by transmitting to said viewer a near-video-on-demand version of said interactive application through a shared information stream, and (ii) responding to a subsequent request from said viewer for transmission of a video-on-demand version of said interactive application through a communication network by transmitting said video-on-demand presentation, if said determining means determines that said transmission would not constrain resources of the interactive communication system.

20. The apparatus of claim 19, wherein said responding means denies said request for the transmission of said video-on-demand version of said interactive application and provides said viewer with an option to view a near-video-on-demand version of said interactive application, when said transmission of said video-on-demand version of said interactive application would constrain resources of the system.

21. The apparatus of claim 19, wherein said viewer requests a video-on-demand version of said interactive application in order to exercise VCR functional features.

22. The apparatus of claim 19, wherein said determining means includes means for determining if the number of currently presented video-on-demand versions of said interactive application equals a predetermined maximum value.

23. The apparatus of claim 19, wherein said determining means includes means for determining if the number of currently presented video-on-demand versions of a plurality interactive applications equals a predetermined maximum value.

24. The apparatus of claim 19, wherein said determining means includes means for calculating available bandwidth of said interactive system's resources in order to determine if said resources can support the transmission of the requested video-on-demand version.

* * * * *